(12) United States Patent
Cao (10) Patent No.: US 6,604,871 B2
(45) Date of Patent: Aug. 12, 2003

(54) METHOD AND APPARATUS FOR COMPENSATING FOR POLARIZATION MODE DISPERSION (PMD) USING A MACH-ZENDER INTERFEROMETER

(75) Inventor: Xiang-Dong Cao, Boynton Beach, FL (US)

(73) Assignee: Siemens Information and Communications Networks, Inc., Boca Raton, FL (US)

( * ) Notice: Subject to any disclaimer, the term of this patent is extended or adjusted under 35 U.S.C. 154(b) by 0 days.

(21) Appl. No.: 10/135,016

(22) Filed: Apr. 23, 2002

(65) Prior Publication Data

US 2002/0118422 A1 Aug. 29, 2002

Related U.S. Application Data

(63) Continuation of application No. 09/034,813, filed on Mar. 4, 1998, now abandoned, which is a continuation of application No. 08/934,250, filed on Sep. 19, 1997, now abandoned.

(51) Int. Cl.[7] ............................................. H04B 10/00
(52) U.S. Cl. ...................... 398/158; 398/147; 398/149
(58) Field of Search ............................... 359/122, 156, 359/161, 127, 181; 385/24, 11

(56) References Cited

U.S. PATENT DOCUMENTS

| | | | | |
|---|---|---|---|---|
| 5,659,412 A | * | 8/1997 | Hakki | ........................ 359/156 |
| 5,712,704 A | * | 1/1998 | Martin et al. | ................ 356/491 |
| 5,822,100 A | * | 10/1998 | Robinson et al. | ........... 359/140 |
| 5,852,496 A | * | 12/1998 | Gisin et al. | ............. 250/227.27 |
| 5,859,939 A | * | 1/1999 | Fee et al. | .................... 359/140 |
| 5,930,414 A | * | 7/1999 | Fishman et al. | ............ 359/140 |

* cited by examiner

Primary Examiner—Leslie Pascal
Assistant Examiner—Dalzid Singh

(57) ABSTRACT

To compensate for polarization mode dispersion (PMD) induced distortion in an optical signal, an optical pulse is split into two orthogonally polarized pulses. A polarization controller selectively aligns the arbitrarily oriented first and second principal states of polarization of the PMD pulses to match fixed orientations of predetermined first and second principal states of polarization of a beam splitter. The PMD pulses are then coupled to a Mach-Zender interferometer that measures the differential delay between them and selectively compensates for the measured differential delay. An optical combiner combines output the compensator PMP pulses to generate a combined output optical signal. Finally, a control arrangement both selectively controls the compensation for a measured differential delay in the interferometer arrangement in response to at least a portion of the combined output optical signal and selectively controls the adjustment of the polarization alignment of the PMD pulses in the polarization controller.

26 Claims, 4 Drawing Sheets

FIG. 1

BEFORE COMPENSATION

AFTER COMPENSATION

METHOD AND APPARATUS FOR COMPENSATING FOR POLARIZATION MODE DISPERSION (PMD) USING A MACH-ZENDER INTERFEROMETER

This is a continuation of application Ser. No. 08/934,250 filed Sep. 19, 1997 now abandoned.

This application is a continuation of U.S. patent application Ser. No. 09/034,813 now abandoned filed Mar. 4, 1998 which is incorporated herein by reference in its entirely.

FIELD OF THE INVENTION

The present invention relates to method and apparatus for compensating for Polarization Mode Dispersion (PMD) in high speed optical communication systems.

BACKGROUND OF THE INVENTION

Polarization Mode Dispersion (PMD) compensation is becoming an urgent issue because it will be the most important limiting factor for high speed optical transmission systems (e.g., OC192 or OC768 systems). For standard single mode optical fibers, the transmission distance of, for example, an OC192 system is limited to 400–600 kilometers due to pulse distortion caused by PMD. Therefore, PMD compensation is very important in upgrading existing system capacity to or beyond the OC192 system level.

Figure 1:
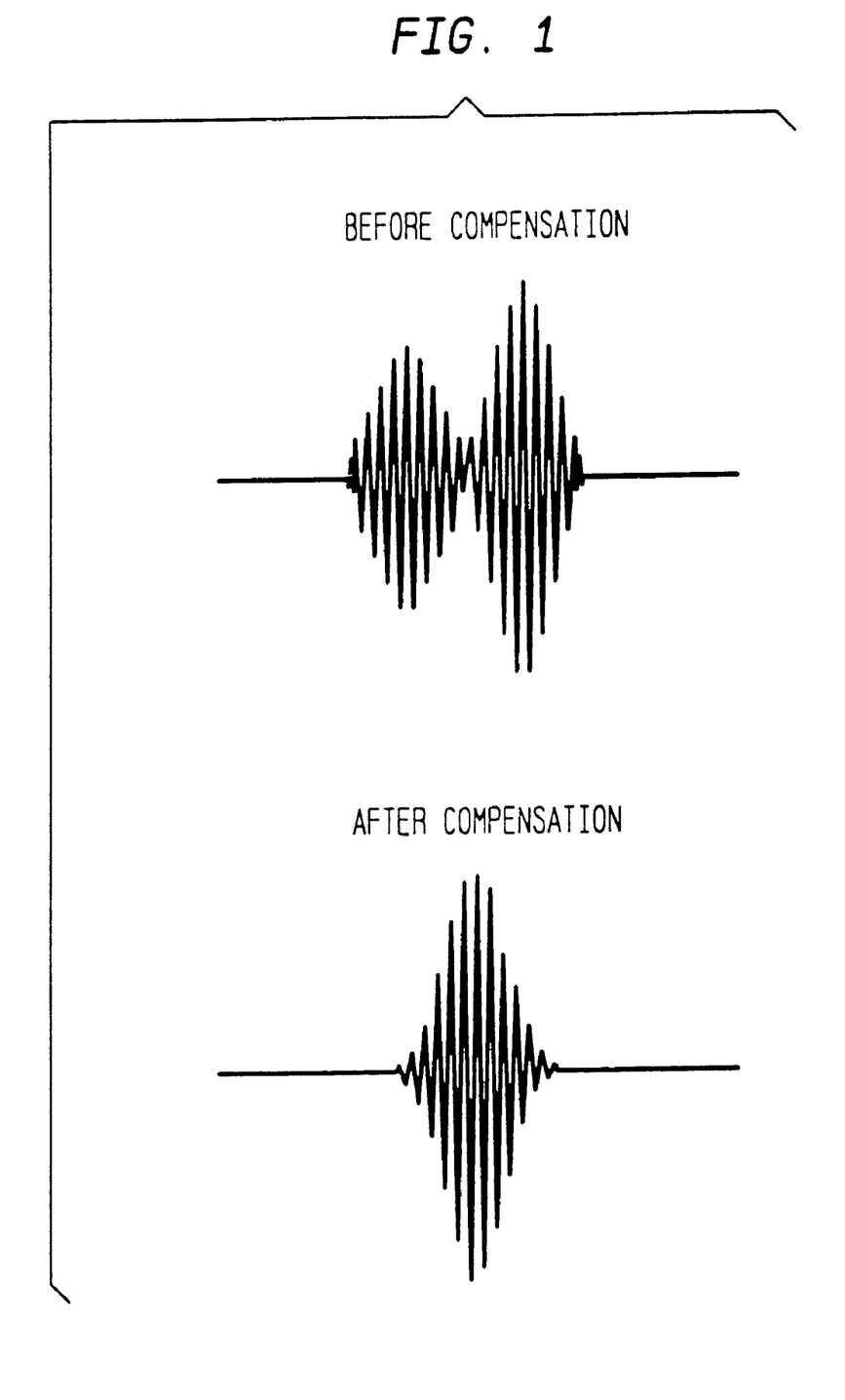
FIG. 1 shows how an exemplary optical signal is affected by Polarization Mode Dispersion (PMD), and the same signal after PMD compensation is applied.

Referring now to FIG. 1, there is shown an exemplary optical signal that is affected by PMD before PMD compensation is applied, and the same signal after PMD compensation. More particularly, PMD causes an optical pulse to be split into two orthogonally polarized pulses with a differential group delay between the two pulses as the optical pulse propagates down an optical fiber. This is shown by the two pulses indicated as "Before Compensation" in FIG. 1. Since receivers in most optical transmission systems are polarization independent, a detected signal will be distorted due to the differential group delay. PMD compensation is a technique which returns the two polarized pulses back into a single in-phase pulse, as is shown by the single pulse indicated as "After Compensation" in FIG. 1, before further transmission or processing in the high speed optical communication system.

Current compensation schemes require a direct measurement of the PMD value, which is very complicated and slow. Since all compensation schemes are based on the assumption of the existence of principal states of polarization (PSP's), the implementation of PMD compensation requires endless polarization tracking of the PSP's. These compensation schemes are not compatible with other polarization control techniques that use scrambling since the data rate of the scrambling techniques are much higher than the response times of current PMD compensators. Other disadvantages of the current PMD compensators include, for example, complicated optical design, mechanically moving parts, high insertion loss, and high cost.

It is desirable to provide a Polarization Mode Dispersion (PMD) compensator for use in high speed optical transmission systems, where the compensator has a simple optical design, a faster response time, and a low cost as compared with known PMD compensation arrangements.

SUMMARY OF THE INVENTION

The present invention is directed to method and apparatus for compensating for Polarization Mode Dispersion (PMD) in high speed optical communication systems. More particularly, the present invention relates to Polarization Mode Dispersion (PMD) compensators using an interferometer arrangement for use in high speed optical communication systems.

Viewed from one aspect, the present invention is directed to a polarization mode dispersion (PMD) compensator for compensating for PMD occurring in an optical input transmission line. The PMD compensator comprises optical circuitry, and an interferometer arrangement. The optical circuitry receives from the optical input transmission line an input signal comprising first and second PMD generated associated optical pulses having first and second principal states of polarization, respectively, and directs the received first and second PMD optical pulses with their first and second principal states of polarization, respectively, onto respective first and second paths. The interferometer arrangement comprises first and second paths that are coupled to the first and second paths, respectively, of the optical circuitry for propagating the respective first and second PMD optical pulses. The interferometer arrangement measures a PMD differential delay between the first and second principal states of polarization of the respective first and second PMD optical pulses, and selectively compensates for the measured differential delay.

Viewed from another aspect, the present invention is directed to a polarization mode dispersion (PMD) compensator for compensating for PMD occurring in an optical input transmission line. The PMD compensator comprising optical circuitry, an interferometer arrangement, an optical combiner, and a control arrangement. The optical circuitry receives from the optical input transmission line an input signal comprising first and second PMD generated optical pulses having arbitrary orientations of first and second principal states of polarization, respectively. The optical circuitry selectively adjusts the aligning of the received arbitrarily oriented first and second principal states of polarization to predetermined fixed first and second principal states of polarization required for directing the first and second PMD optical pulses onto respective first and second output paths. The interferometer arrangement comprises first and second paths that are coupled to the first and second output paths, respectively, of the optical circuitry for propagating the respective first and second PMD optical pulses. The interferometer arrangement measures a PMD differential delay between the first and second principal states of polarization of the respective first and second PMD optical pulses, and selectively compensates for the measured differential delay. The optical combiner optically combines the signals from the first and second paths of the interferometer arrangement to generate a combined output signal. The control arrangement selectively controls the compensation for a measured differential delay between the first and second polarization states in the interferometer arrangement in response to at least a portion of the combined output signal from the optical combiner, and for selectively adjusting the aligning of the received first and second polarizations to the required predetermined fixed first and second polarizations in the optical circuitry.

Viewed from still another aspect, the present invention is directed to a method of compensating for polarization mode dispersion (PMD) produced in a transmission line. In a first step of the method, an input signal is received comprising first and second PMD generated optical pulses having arbitrary orientations of their first and second principal states of polarization, respectively. In a second step of the method, the arbitrarily oriented first and second principal states of polarization are adjusted in a polarization controller to match orientations of predetermined fixed first and second principal states of polarization of a polarization beam splitter. In a third step of the method, the first and second PMD optical pulses with the adjusted first and second principal states of polarization, respectively, are directed onto respective first and second output paths of the beam splitter. In a fourth step of the method, a PMD differential delay between the predetermined fixed first and second principal states of polarization of the first and second PMD optical pulses, respectively, is measured. In a fifth step of the method, the measured differential delay from the fourth step is selectively compensated for in an interferometer arrangement comprising first and second paths that are coupled to the first and second output paths, respectively, of the polarization beam splitter.

The invention will be better understood from the following more detailed description taken with the accompanying drawings and claims.

DETAILED DESCRIPTION

All components of the various embodiments of the present invention performing essentially the same function in the different embodiments have the same last two digits for their reference numbers.

Figure 2:
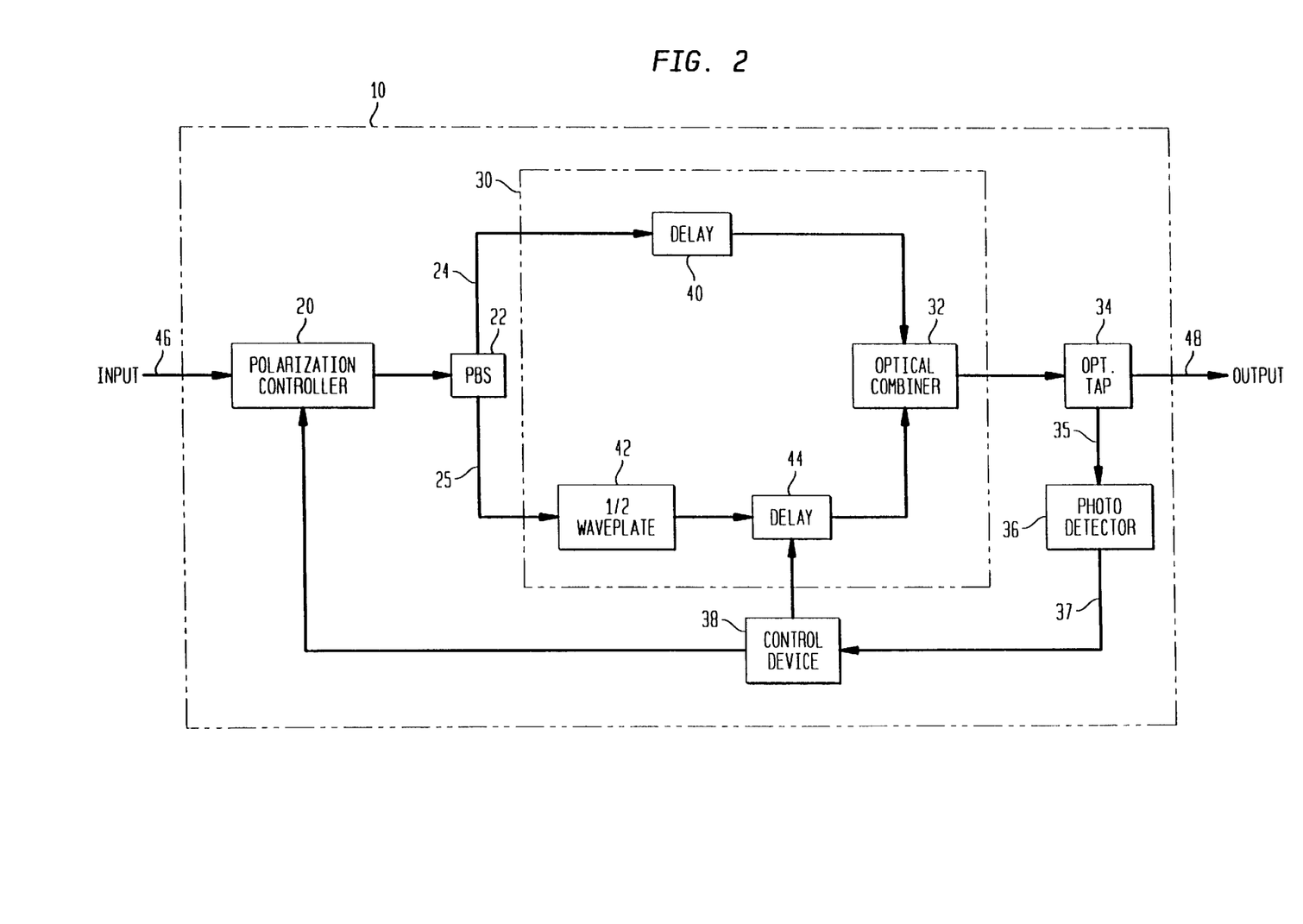
FIG. 2 is a block diagram of a Polarization Mode Dispersion compensator in accordance with a first embodiment of the present invention.

Referring now to FIG. 2, there is shown a block diagram of a Polarization Mode Dispersion (PMD) compensator 10 (shown within a dashed line rectangle) in accordance with a first embodiment of the present invention. The PMD compensator 10 comprises a polarization controller 20, a polarization beam splitter (PBS) 22, a Mach-Zender interferometer arrangement 30 (shown within a dashed line rectangle), and optical tap (OPT. TAP) 34, a photodetector 36, and a control device 38. PMD occurs as an optical pulse propagates along the length of an optical transmission line 46 of a high speed optical transmission system. It results in the single pulse to be split into first and second orthogonally polarized pulses with a differential delay between them as is shown in FIG. 1. The amount of delay between the first and second orthogonally polarized pulses, after propagating the length of the optical transmission line 46, is dependent on various factors such as transmission line length, frequency, temperature, etc. It is to be understood that any reference to an input signal to the arrangement 10 hereinafter is referring to the first and second orthogonally polarized PMD pulses that have a differential delay therebetween that occurred in the optical transmission line 46.

The polarization controller 20 is responsive to the input optical signal from the optical transmission line 46 for aligning the polarizations of the principal states of polarizations of the first and second input PMD pulses to two perpendicular axes of the polarization beam splitter 22. The polarization beam splitter 22 is responsive to the output signal from the polarization controller 20 for diverting one of two principal states of polarization of the input signal onto a first path 24 and the other of the two principal states of polarization of the input signal onto a second path 25. Therefore, the first PMD pulse of the input signal having the first polarization state is diverted to the first path 24 while a second PMD pulse of the input signal having the second orthogonal polarization state is diverted to the second path 25. If the polarizations of the first and second PMD pulses were not aligned to the two perpendicular axes of the polarization beam splitter 22 by the polarization controller 20, some of each of the first and second PMD pulses would be diverted into each of the paths 24 or 25 by the beam splitter 22 producing distortion.

The Mach-Zender interferometer arrangement 30 includes a first delay element 40, a ½ waveplate 42, a second delay element 44, and an optical combiner 32. The first path 24 extends through the Mach-Zender interferometer arrangement 30 and includes the delay element 40 coupled therein which delays the first PMD pulse having the first polarization state by a fixed predetermined amount of time. The delay element 40 can comprise any suitable optical delay element known in the art as, for example, a length of an optical fiber or other optical delay element providing a fixed predetermined delay. The delayed output from the delay element 40 is coupled to a first input of the optical combiner 32. The second path 25 extends through the Mach-Zender interferometer arrangement 30 and comprises a serial coupling of the ½ waveplate 42 and the second delay element 44. The ½ waveplate 42 functions to rotate the polarization of the second PMD pulse of the input signal by 90 degrees so that the rotated polarization state is now aligned with the first polarization state of the first PMD signal in the first path 24 when the optical combiner 32 is a 50:50 coupler. If the optical combiner 32 is a polarization combiner, then the ½ waveplate 42 functions to align the polarization of the second PMD pulse to the proper polarization state of the polarization combiner. In this case, a polarizer (not shown) should be inserted in front of the photodetector 36 to allow proper interference between the two PMD pulses.

The output from the ½ waveplate 42 is delayed in the second delay element 44 by a selective amount as determined by a control signal from the control device 38 to effect a synchronization of the second PMD pulse in the path 25 with the first PMD pulse in the path 24. The delayed output from the second delay element 44 is coupled to a second input of the optical combiner 32. In actuality, the Mach-Zender interferometer arrangement 30 is effectively used to measure an interference visibility between the two principal states of polarization, where a maximum interference visibility corresponds to a minimum delay between the two polarizations. Then, the optical delay is selectively adjusted between the two interfering paths 24 and 25 to maximize the interference visibility and enable the compensation for the PMD. It is to be understood that although the Mach-Zender interferometer provides special advantages as shown hereinabove, any other suitable interferometer arrangement which is able to measure a differential delay between two polarization states, and compensate for such differential delay can be used.

The optical combiner 32 is, for example, a 50/50 optical combiner which combines the first and second PMD pulses into an output signal which is coupled to the optical tap 34. An output signal of the optical combiner 32, if processed properly in the Mach-Zender interferometer arrangement 30, comprises an optical signal where both the first and second PMD pulses are synchronized and in phase. The optical tap 34 diverts a small portion (e.g., 5%) of the optical output signal from the optical combiner 32 to the photodetector 36 via an optical fiber 35 forming a part of a feedback path. The remaining portion of the output signal from the optical tap 34 provides the optical output signal from the PMD compensator 10 for propagation along a transmission line 48 to a remote receiver or processing device. The photodetector 36 converts the received optical signal into a corresponding electrical control signal which is coupled to the control device 38. The control device 38 is responsive to the electrical control signal from the photodetector 36 to generate a control signal to the second delay element 44 to selectively alter the delay provided by the second delay element 44 in a direction that causes the second PMD pulse in the second path 25 to be synchronized with first PMD pulse in the path 24. The control device 38 also provides a control signal to the polarization controller 20 to cause the polarization controller 20 to correctly align the polarization of the principal states of the input signal to the axes of the polarization beam splitter 22 if polarization of the principal states of the input signal are not already properly aligned. A combination of the polarization controller 20 and the PBS 22 may be denoted as an "optical circuit". The control device 38 may be denoted as a "control arrangement".

Figure 3:
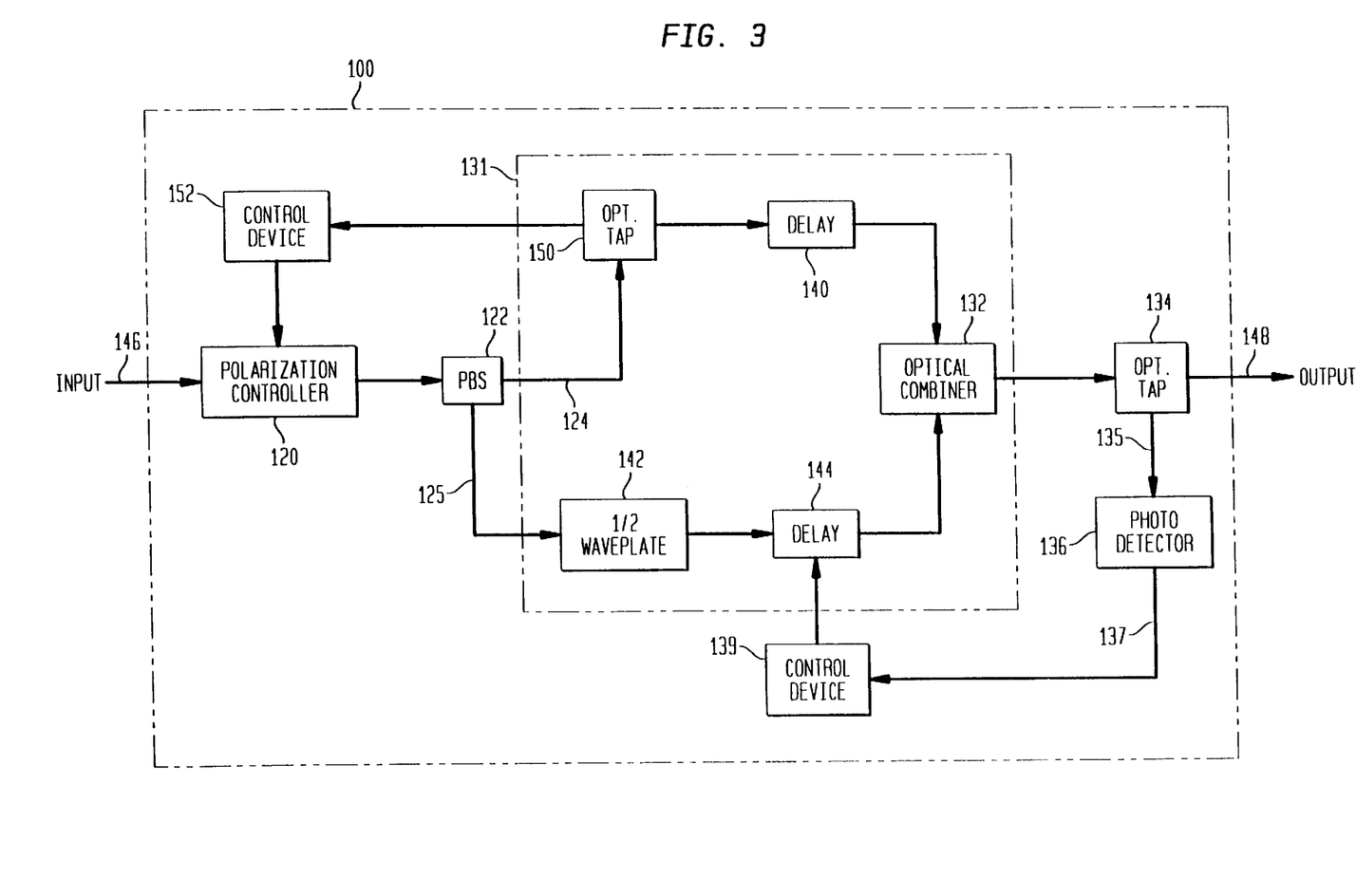
FIG. 3 is a block diagram of a Polarization Mode Dispersion compensator in accordance with a second embodiment of the present invention.

Referring now to FIG. 3, there is shown a block diagram of a Polarization Mode Dispersion (PMD) compensator 100 (shown within a dashed line rectangle) in accordance with a second embodiment of the present invention. The PMD compensator 100 comprises a polarization controller 120, a polarization beam splitter (PBS) 122, a Mach-Zender interferometer arrangement 131 (shown within a dashed line rectangle), an optical tap (OPT. TAP) 134, a photodetector 136, a first control device 139, and a second control device 152. The polarization controller 120, polarization beam splitter 122, optical tap 134, and photodetector 136 function in the same manner as described hereinbefore for the polarization controller 20, polarization beam splitter 22, optical tap 34, and photodetector 36, respectively, of the PMD compensator 10 of FIG. 2.

The Mach-Zender interferometer arrangement 131 comprises a first delay element 140, a ½ waveplate 142, a second delay element 144, an optical tap (OPT. TAP) 150, and an optical combiner 132. The difference between the Mach-Zender interferometer arrangement 131 and the Mach-Zender interferometer arrangement 30 of FIG. 2, is that the optical tap 150 is coupled in a first path 124 between the polarization beam splitter 122 and the first delay element 140. The optical tap 150 diverts a small portion (e.g., 5%) of the first PMD pulse having the first polarization state from the polarization beam splitter 122 to the second control device 152 and the remainder (e.g., 95%) of the first PMD pulse to the first delay element 140. The second control device 152 functions to convert the optical signal from the optical tap 150 into an electrical control signal to the polarization controller 120. This electrical control signal is used by the polarization controller 120 to correctly align the principal states of polarization of the input signal from the transmission line 146 to the axes of the polarization beam splitter 122 if polarization of the principal states of polarization of the input signal are not already properly aligned.

A second output path 125 from the polarization beam splitter 122 extends through the Mach-Zender interferometer arrangement 131 and comprises a serial coupling of the ½ waveplate 142 and the second delay element 144. The first delay element 140, ½ waveplate 142, and second delay element 144 correspond in arrangement and function to the first delay element 40, ½ waveplate 42, and second delay element 44, respectively, described for the Mach-Zender interferometer arrangement 30 of FIG. 2. The combined output signal from the Mach-Zender interferometer arrangement 131 is provided to the first control device 139 via the optical combiner 132, the optical tap 134, the optical feedback path 135, the photodetector 136, and the electrical feedback path 137 in the manner described for the corresponding elements in the PMD compensator 10 of FIG. 2. The first control device 139 is responsive to the control signal of the feedback path 137 for only altering the delay in the second delay element 144 and thereby reduce the differential group delay between the first and second PMD pulses in the first and second paths 124 and 125 in the Mach-Zender interferometer arrangement 131. More particularly, the first control device 139 functions to automatically track the differential group delay changes while the second control device 152 functions to track the polarization fluctuations in the first and second PMD pulses in the input signal from transmission line 146. An output signal from the PMD compensator 100 is provided to a transmission line 146 via the optical tap 134 in the manner described for the optical tap 34 of the PMD compensator 10 of FIG. 2. A combination of the polarization controller 120 and the PBS 122 may be denoted as an "optical circuit". The control devices 139 and 152 may be denoted as a "control arrangement".

Figure 4:
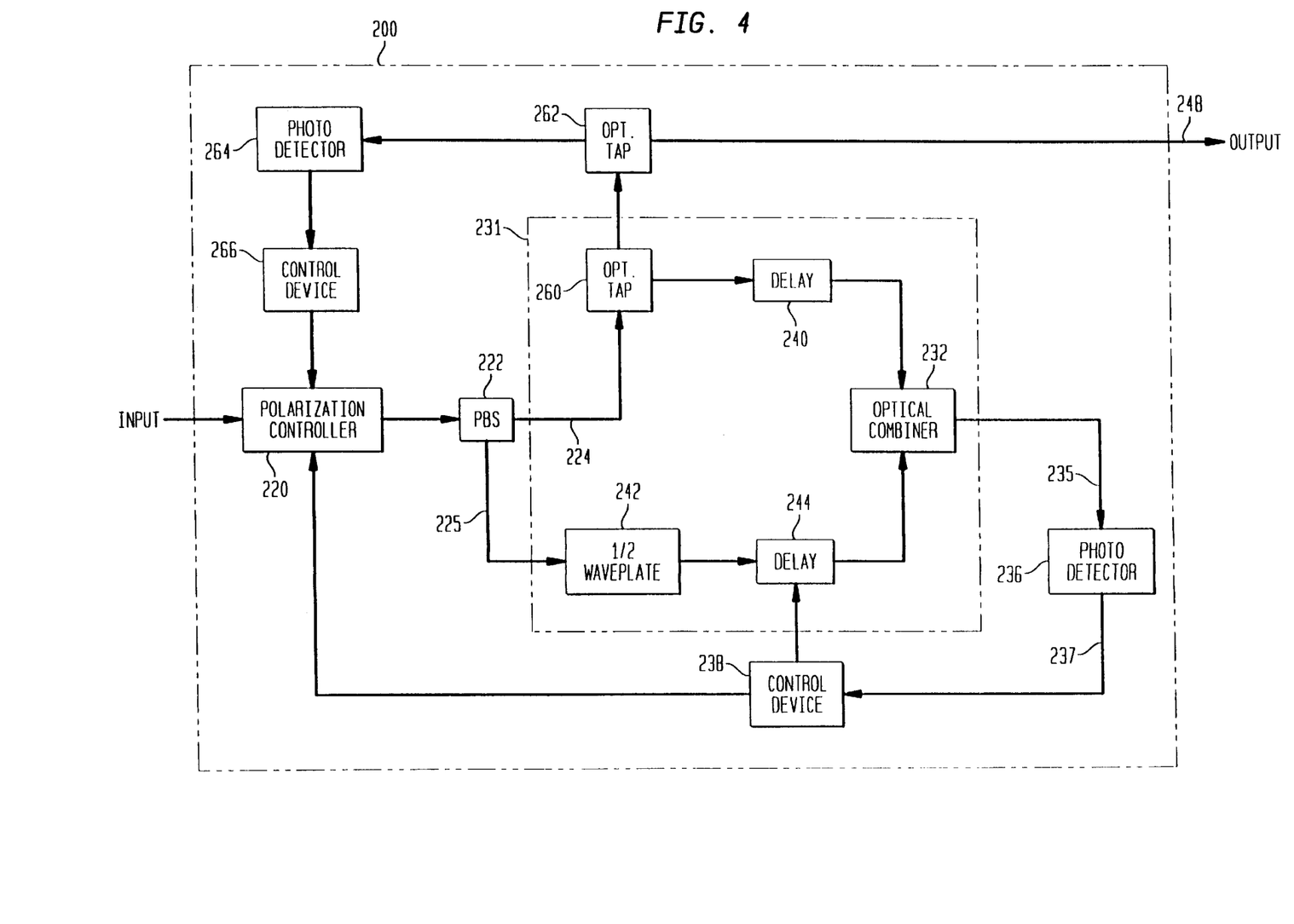
FIG. 4 is a block diagram of a Polarization Mode Dispersion compensator in accordance with a third embodiment of the present invention.

Referring now to FIG. 4, there is shown a block diagram of a Polarization Mode Dispersion (PMD) compensator 200 (shown within a dashed line rectangle) in accordance with a third embodiment of the present invention. The PMD compensator 200 comprises a polarization controller 220, a polarization beam splitter (PBS) 222, a Mach-Zender interferometer arrangement 231 (shown within a dashed line rectangle), a first photodetector 236, a first control device 238, an optical tap (OPT. TAP) 262, a second photodetector 264, and a second control device 266. The polarization controller 220, polarization beam splitter 222, photodetector 236, and first control device 238 function in the same manner as described hereinbefore for the polarization controller 20, polarization beam splitter 22, photodetector 36, and control device 38, respectively, of the PMD compensator 10 of FIG. 2.

The Mach-Zender interferometer arrangement 231 comprises a first delay element 240, a ½ waveplate 242, a second delay element 244, an optical tap (OPT. TAP) 260, and an optical combiner 232. The difference between the Mach-Zender interferometer arrangement 131 of FIG. 3 and the Mach-Zender interferometer arrangement 231, is that in the interferometer arrangement 231 the optical tap 260 diverts a large portion (e.g., 95%) of the first PMD pulse having the first polarization state from the polarization beam splitter 222 to the optical tap 262, and the remainder (e.g., 5%) of the first PMD pulse to the first delay element 240. The optical tap 262 diverts a large portion (e.g., 95%) of the first PMD pulse having the first polarization state from the optical tap 262 to the output of the PMD compensator 200 via a transmission line 248, and the remainder (e.g., 5%) of the first PMD pulse to the second photodetector 264. The second photodetector 264 converts the optical signal from the optical tap 262 into an electrical control signal which is provided as an input to the second control device 266. The second control device 266 is responsive to the electrical control signal from the second photodetector 264 for generating a control signal to the polarization controller 220.

The polarization controller uses this electrical control signal to coarsely align the principal states of polarization of the input signal from the transmission line 246 to the axes of the polarization beam splitter 222.

A second output path 225 from the polarization beam splitter 222 extends through the Mach-Zender interferometer arrangement 231 and comprises a serial coupling of the ½ waveplate 242 and the second delay element 244. The first delay element 240, ½ waveplate 242, and second delay element 244 correspond in arrangement and function to the first delay element 40, ½ waveplate 42, and second delay element 44, respectively, described for the Mach-Zender interferometer arrangement 30 of FIG. 2. The output signals from the Mach-Zender interferometer arrangement 231 are combined in the optical combiner 232 and provided to the first control device 238 via an optical feedback path 235, the photodetector 236, and an electrical feedback path 237 similar to that described for the corresponding elements having the same last two digits in the PMD compensator 10 of FIG. 2. The first control device 238 is responsive to the control signal from the feedback path 237 for generating an electrical control signal to the second delay element 244 for altering the delay therein to minimize the differential group delay between the first and second PMD pulses in the first and second paths 224 and 225 in the Mach-Zender interferometer arrangement 231. The first control device 238 also generates an electrical control signal to the polarization controller 220 to cause a fine adjustment for aligning the principal states of polarization of the input signal to the axes of the polarization beam splitter 222. More particularly, the second control device 266 functions to coarsely track polarization fluctuations in the first and second PMD pulses in the input signal from transmission line 246. Concurrently, the first control device 238 functions to automatically track the differential group delay changes between the first and second PMD pulses for altering the delay in the second delay element 244 and thereby minimize the differential group delay between the first and second PMD pulses in the first and second paths 224 and 225 in the Mach-Zender interferometer arrangement 231.

The first control device 238 also uses this detected PMD delay to generate an electrical control signal to the polarization controller 220 in order cause the polarization controller 220 to fine tune the aligning of the principal states of polarization of the input signal to the axes of the polarization beam splitter 222. In operation, the control signal from the second control device 266 has a higher priority that the control signal from the first control device 238. Therefore, the polarization controller 220 always responds to a control signal from the second control device 266 to make a coarse adjustment before it responds to a concurrent control signal from the first control device 238 to make a fine adjustment. More particularly, the second control device 266 provides a control signal which is mostly sinusoidal and has a flat bottom near the optimum point of adjustment. Therefore, this control signal does not have sufficient resolution to permit the polarization controller 220 to further adjust and achieve maximum alignment of the two polarization states. This is where the control signal from the first control device 238 takes over to achieve that maximum alignment of the two polarization states with the axes of the polarization beam splitter 222.

The PMD compensator 200 differs from the PMD compensators 10 and 100 in that only one polarization state is selected and sent out on the transmission line 248 via the optical tap 262 without combining the other polarization component therewith. The power loss caused by discarding one polarization component can be compensated for by using an Erbium-doped fiber amplifier (not shown) in the transmission line 248. The Mach-Zender interferometer arrangement 231 is used to detect the PMD value, while the PMD compensation is done by correctly selecting one polarization component and coarsely adjusting the polarization controller 220 therewith and fine tuning the adjusting of the polarization controller 220 based on the detected PMD value. Doing so drastically increases the compensating speed.

The advantages of the present PMD compensators 10, 100, and 200 are that each is a cost-effective first-order PMD compensator that has fewer optical components than that of prior art arrangement so as to enable the combining of the feedback control and PMD measurement within a single Mach-Zender interferometer arrangement 30. A combination of the polarization controller 220 and the PBS 222 may be denoted as an "optical circuit". The control devices 238 and 266 may be denoted as a "control arrangement".

It is to be appreciated and understood that the specific embodiments of the present invention described hereinabove are merely illustrative of the general principles of the invention. Various modifications may be made by those skilled in the art which are consistent with the principles set forth.

What is claimed is:

1. A polarization mode dispersion (PMD) compensator for compensating for PMD occurring in an optical transmission line comprising:

optical circuitry for receiving from the optical transmission line an input optical signal comprising first and second PMD associated optical pulses having first and second states of polarization respectively, and for directing the received first and second PMD associated optical pulses with their first and second states of polarization, respectively, onto first and second paths; and an interferometer arrangement comprising:
a waveplate coupled in the second path for rotating the second state of polarization of the second PMD associated optical pulse so that the first and second states of polarization are aligned;
a delay element coupled in one of the first and second paths for selectively inserting a delay in the PMD associated optical pulse propagating therethrough so that a measured differential delay between the first and second PMD associated optical pulses, is selectively compensated for with the delay element in order to synchronize the first and second PMD associated optical pulses; and
an optical combiner for optically combining the synchronized first and second PMD signals from the first and second paths of the interferometer arrangement to generate a combined optical output signal.

2. The PMD compensator of claim 1 wherein the interferometer arrangement comprises:

a supplemental delay element coupled in other of the first and second paths for selectively inserting a delay in the PMD associated optical pulse propagating therethrough in order to synchronize the first and second PMD associated pulses propagating in the first and second paths, respectively.

3. The PMD compensator of claim 1 wherein the interferometer arrangement is a Mach-Zender interferometer arrangement.

4. The PMD compensator of claim 1 wherein the output signal from the optical combiner provides an output signal from the PMD compensator.

5. The PMD compensator of claim 1 further comprising a control device for selectively controlling compensation for the differential delay measured in the interferometer arrangement.

6. The PMD compensator of claim 5 further comprising a feedback path for feeding at least a portion of the output signal from the optical combiner back to the control device.

7. The PMD compensator of claim 6 further comprising a photodetector coupled in the feedback path for converting the portion of the output signal from the PMD compensator into a corresponding electrical control signal for transmission to the control device.

8. The PMD compensator of claim 1 further comprising a control device for selectively controlling compensation for the differential delay measured in the interferometer arrangement.

9. The PMD compensator of claim 8, further comprising a feedback path for feeding at least a portion of the output signal from the interferometer arrangement back to the control device.

10. The PMD compensator of claim 9 further comprising a photodetector coupled in the feedback path for converting the portion of the output signal from the interferometer arrangement into a corresponding electrical control signal for transmission to the control device.

11. The PMD compensator of claim 1 wherein the optical circuitry comprises:
- a polarization beam splitter for separating the input optical signal into the first and second PMD associated optical pulses having first and second states of polarization and for directing the first and second PMD associated optical pulses onto the first and second paths respectively; and
- a polarization controller for receiving from the optical transmission line the input optical signal comprising the first and second PMD associated optical pulses having first and second states of polarization, respectively, and for selectively aligning the received first and second states of polarization of the first and second PMD associated optical pulses, respectively, to the respective first and second states of polarization accepted by the optical beam splitter.

12. The PMD compensator of claim 11 further comprising:
- a control device responsive to at least a portion of the combined output signal from the optical combiner for selectively controlling the compensation for the measured differential delay in the interferometer arrangement and the polarization adjustments in the polarization controller.

13. The PMD compensator of claim 11 further comprising:
- a first control device responsive to at least a portion of the combined optical output signal from the optical combiner for selectively controlling the compensation for the measured differential delay in the interferometer arrangement; and
- a second controller responsive to the PMD pulse propagating in one of the first and second paths of the interferometer arrangement for selectively controlling the polarization adjustments in the polarization controller.

14. The PMD compensator of claim 11 further comprising:
- a first control device responsive to at least a portion of the combined optical output signal from the optical combiner for selectively controlling both the compensation for the measured differential delay in the interferometer arrangement, and fine aligning adjustments of the polarization adjustments in the polarization controller; and
- a second control device responsive to the PMD pulse propagating in one of the first and second paths of the interferometer arrangement for selectively controlling coarse aligning adjustments of the polarization adjustment in the polarization controller.

15. The PMD compensator of claim 14 wherein the interferometer arrangement comprises an optical tap in the first path thereof that diverts a predetermined amount of the first PMD pulse as a control signal to the second control device for selectively controlling coarse aligning adjustments in the polarization controller.

16. The PMD compensator of claim 15 further comprising a second optical tap coupled between the optical tap in the first path of the interferometer arrangement and the second control device for diverting a portion of the PMD pulse from the optical tap in said first path as an output optical signal from the PMD compensator.

17. A polarization mode dispersion (PMD) compensator for compensating for PMD occurring in an optical input transmission line comprising:
- optical circuitry for receiving from the optical input transmission line an input signal comprising first and second PMD generated optical pulses having arbitrarily oriented first and second principal states of polarization, respectively, and for selectively adjusting the aligning of the received arbitrarily oriented first and second principal states of polarization to predetermined fixed first and second principal states of polarization required for directing the first and second PMD optical pulses onto respective first and second output paths;
- an interferometer arrangement comprising first and second paths that are coupled to the first and second output paths, respectively, of the optical circuitry for propagating the respective first and second PMD optical pulses, the interferometer arrangement measuring any PMD induced differential delay between the first and second principal states of polarization of the respective first and second PMD optical pulses, and selectively compensating for the measured differential delay;
- an optical combiner for optically combining the signals from the first and second paths of the interferometer arrangement to generate a combined output signal; and
- a control arrangement for selectively controlling both the compensation for the measured differential delay between the first and second polarization states in the interferometer arrangement in response to at least a portion of the combined output signal from the optical combiner, and for selectively adjusting the aligning of the received arbitrarily oriented first and second polarizations to the required predetermined fixed first and second polarizations in the optical circuitry.

18. The PMD compensator of claim 17 wherein the interferometer arrangement comprises:
- a first delay element coupled in the first path for inserting a predetermined fixed delay in the first PMD optical pulse having the first principal state of polarization propagating therethrough;
- a waveplate coupled in the second path for rotating the second principal state of polarization of the second PMD optical pulse so that the first and second principal states of polarization of the first and second PMD pulses, respectively, are aligned; and a second delay element coupled in the second path for selectively inserting a delay in the second PMD associated optical pulse propagating therethrough in order to synchronize the first and second PMD pulses propagating in the first and second paths, respectively.

19. The PMD compensator of claim 18 wherein the control arrangement comprises:

a first control device for selectively controlling the compensation for the measured differential delay between the first and second polarization states in the interferometer arrangement; and a second control device for controlling the optical adjustment of the aligning of the c received first and second polarizations to the required predetermined fixed first and second polarizations in the optical circuitry; and the interferometer arrangement further comprises an optical tap coupled in the first path thereof for diverting a portion of the first PMD associated optical pulse having the first principal state of polarization propagating therein as a control signal to the second control device.

20. The PMD compensator of claim 19 further comprising a second optical tap coupled between the optical tap of the interferometer arrangement and the second control device, the second optical tap diverting a predetermined portion of the portion of the first PMD associated optical pulse from the optical tap of the interferometer arrangement to the second control device, and the remainder as an output signal from the PMD compensator.

21. The PMD compensator of claim 17 wherein the interferometer arrangement is a Mach-Zender interferometer arrangement.

22. The PMD compensator of claim 17 wherein at least a major portion of the combined output signal from the optical combiner provides an output signal from the PMD compensator.

23. A method of compensating for polarization mode dispersion (PMD) produced in a transmission line comprising the steps of:

(a) receiving an input optical signal comprising first and second PMD associated optical pulses having arbitrary orientations of their first and second principal states of polarization, respectively;

(b) adjusting the arbitrarily oriented first and second principal states of polarization in a polarization controller to match predetermined fixed first and second principal states of polarization of a polarization beam splitter;

(c) directing the first and second PMD optical pulses with their adjusted first and second principal states of polarization, respectively, from step (b) onto respective first and second output paths of the beam splitter;

(d) rotating one of the first and second principal state of polarization of the first and second PMD associated optical pulses with a waveplate coupled in one of-the first and second paths so that the first and second principal states of polarization are aligned;

(e) selectively compensating for a measured differential delay in an interferometer arrangement comprising first and second paths that are coupled to the first and second output paths, respectively, of the polarization beam splitter the selective compensation including delaying one of the first and second PMD associated optical pulses with an optical delay element coupled in one of the respective first and second paths in order to synchronize the first and second PMD associated pulses propagating in the first and second paths; and (f) optically combining the signals from the first and second paths of the interferometer arrangement with an optical combiner to generate a combined optical output signal.

24. The method of claim 23 wherein performing step (e), includes performing the steps of:

(g) measuring any PMD induced differential delay between the predetermined fixed first and second principal states of polarization of the respective first and second PMD optical pulses, respectively;

(h) delaying the other one of the first and second PMD associated optical pulses with an optical delay element coupled in one of the respective first and second paths in order to synchronize the first and second PMD associated pulses propagating in the first and second paths;

(i) selectively adjusting the compensation for a measured differential delay between the first and second polarization states in the interferometer arrangement in response to the combined output signal of step (f) to minimize the differential group delay, and selectively adjusting the alignment of the arbitrarily oriented received first and second polarizations to a required predetermined fixed first and second polarizations in the optical circuitry.

25. The method of claim 24 wherein performing step (i), includes performing the steps of:

(i1) selectively adjusting the compensation for the measured differential delay between the first and second polarization states in the interferometer arrangement in response to at least a portion of the combined output signal of step (f) with a first control device; and (i2) selectively adjusting the aligning of the arbitrarily oriented received first and second polarizations to the required predetermined fixed first and second polarizations in the optical circuitry with a second control device responsive to the PMD pulse propagating in one of the first and second paths of the interferometer arrangement.

26. The method of claim 25 wherein in performing step (i2), diverting a predetermined amount of the first PMD pulse from the first path of the interferometer arrangement via an optical tap as a control signal to the second control device for selectively controlling the aligning of the arbitrarily oriented first and second states of polarization to the predetermined fixed first and second states of polarization of the polarization beam splitter.

* * * * *